United States Patent
Grigsby et al.

(10) Patent No.: US 8,639,041 B2
(45) Date of Patent: *Jan. 28, 2014

(54) PRODUCT IDENTIFICATION USING IMAGE ANALYSIS AND USER INTERACTION

(75) Inventors: Travis M Grigsby, Austin, TX (US); Sunil K Mishra, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,331

(22) Filed: Mar. 26, 2012

(65) Prior Publication Data

US 2012/0183185 A1 Jul. 19, 2012

Related U.S. Application Data (63) Continuation of application No. 12/244,493, filed on Oct. 2, 2008, now Pat. No. 8,194,985.

(51) Int. Cl.
*G06K 9/00* (2006.01)
*G06Q 30/00* (2012.01)
*G06F 17/30* (2006.01)

(52) U.S. Cl.
USPC ......... 382/218; 382/141; 705/26.1; 705/27.1; 707/E17.014

(58) Field of Classification Search
USPC ......... 382/100, 110, 302, 304, 307, 141, 209, 382/218; 705/16, 21, 23, 26.1, 27.1; 715/230, 762, 763; 717/105, 108; 345/440; 707/E17.014
See application file for complete search history.

(56) References Cited

U.S. PATENT DOCUMENTS

| | | | |
|---|---|---|---|
| 7,731,091 B2 | 6/2010 | Knowles et al. | |
| 7,864,178 B2 * | 1/2011 | Marini et al. | 345/440 |
| 8,028,246 B2 | 9/2011 | McIntyre et al. | |
| 8,194,985 B2 * | 6/2012 | Grigsby et al. | 382/218 |
| 2007/0168943 A1 * | 7/2007 | Marini et al. | 717/108 |
| 2008/0059281 A1 * | 3/2008 | Tower et al. | 705/10 |

OTHER PUBLICATIONS like.com, http://www.like.com/, 2005-2008, 2 pages.
Riya Visual Search, http://www.riya.com/, 2005-2008, 1 page.

* cited by examiner

*Primary Examiner* — Sheela Chawan
(74) *Attorney, Agent, or Firm* — Jeffrey T. Holman (57) ABSTRACT

A product identification service uses image analysis and user interaction. The product identification service includes functionality to compare a first portion of a retail product image to a plurality of candidate retail product images. The retail product image includes a pictorial likeness of a plurality of manufactured retail products. The first portion of the retail product image corresponds to a first retail product. The product identification service also includes functionality to generate a candidate product set comprising candidate retail product images satisfying image comparison criteria. Each candidate retail product image is representative of a retail product having a plurality of product characteristics. The product identification service also includes functionality to determine, based on at least one candidate retail product image in the candidate product set, one or more product identity queries configured to solicit additional product identity information from a user.

20 Claims, 7 Drawing Sheets

PRODUCT IDENTIFICATION USING IMAGE ANALYSIS AND USER INTERACTION

CROSS-REFERENCE TO RELATED APPLICATIONS

This application is a continuation of U.S. application Ser. No. 12/244,493, filed on Oct. 2, 2008, which is incorporated by reference herein in its entirety.

BACKGROUND

This invention relates to identifying a product and more particularly relates to product identification using image analysis and user interaction.

As the number of manufactured retail products in a typical family's home increases, the number of warranty cards, instruction manuals, and accessories also increases. Often, the very identity of many products is also lost, thus making it hard to order new accessories or investigate warranty information. Typically, an individual can preserve the identity of a product by saving the product packaging, instruction manual, receipt or other materials that provide model numbers and the like for the product. However, even with taking these protective measures which require foresight and continual maintenance, this documentation remains difficult to sift through. In addition, different retailers use various SKU's, model numbers may change, and so forth.

Many times, retailers and manufacturers will only maintain information on their websites for the most recent version of a product with a particular model number, even if the appearance or function has changed between versions. As a result, the only means to identify a product is often the physical appearance of the product itself. However, not all manufacturers' websites have product images. Even so, many products appear similar at first glance. Moreover, an individual may not even know a product's manufacturer or place of origin. Web-based image recognition software exists which will search for images or items of similar color or shape. However, the results will depend alone on the quality of the image comparison, and, even if similar products are returned, an individual will still be unsure of the identity of his product.

SUMMARY

Embodiments described herein include a product identification service. In one embodiment, the product identification service uses image analysis and user interaction. The product identification service includes functionality to compare a first portion of a retail product image to a plurality of candidate retail product images. The retail product image includes a pictorial likeness of a plurality of manufactured retail products. The first portion of the retail product image corresponds to a first retail product. The product identification service also includes functionality to generate a candidate product set comprising candidate retail product images satisfying image comparison criteria. Each candidate retail product image is representative of a retail product having a plurality of product characteristics. The product identification service also includes functionality to determine, based on at least one candidate retail product image in the candidate product set, one or more product identity queries configured to solicit additional product identity information from a user. Other embodiments of the product identification service are also described.

Embodiments described herein also include product compatibility analysis. In one embodiment, the product compatibility analysis includes comparing a first retail product image to a first plurality of candidate retail product images to identify a first retail product depicted in the first retail product image. The product compatibility analysis also includes comparing a second retail product image to a second plurality of candidate retail product images to identify a second retail product depicted in the second retail product image. The product compatibility analysis also includes performing a compatibility check to identify at least one product characteristic related to compatibility information between the first retail product and the second retail product. Other embodiments of the product compatibility analysis are also described.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

Throughout the description, similar reference numbers may be used to identify similar elements.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
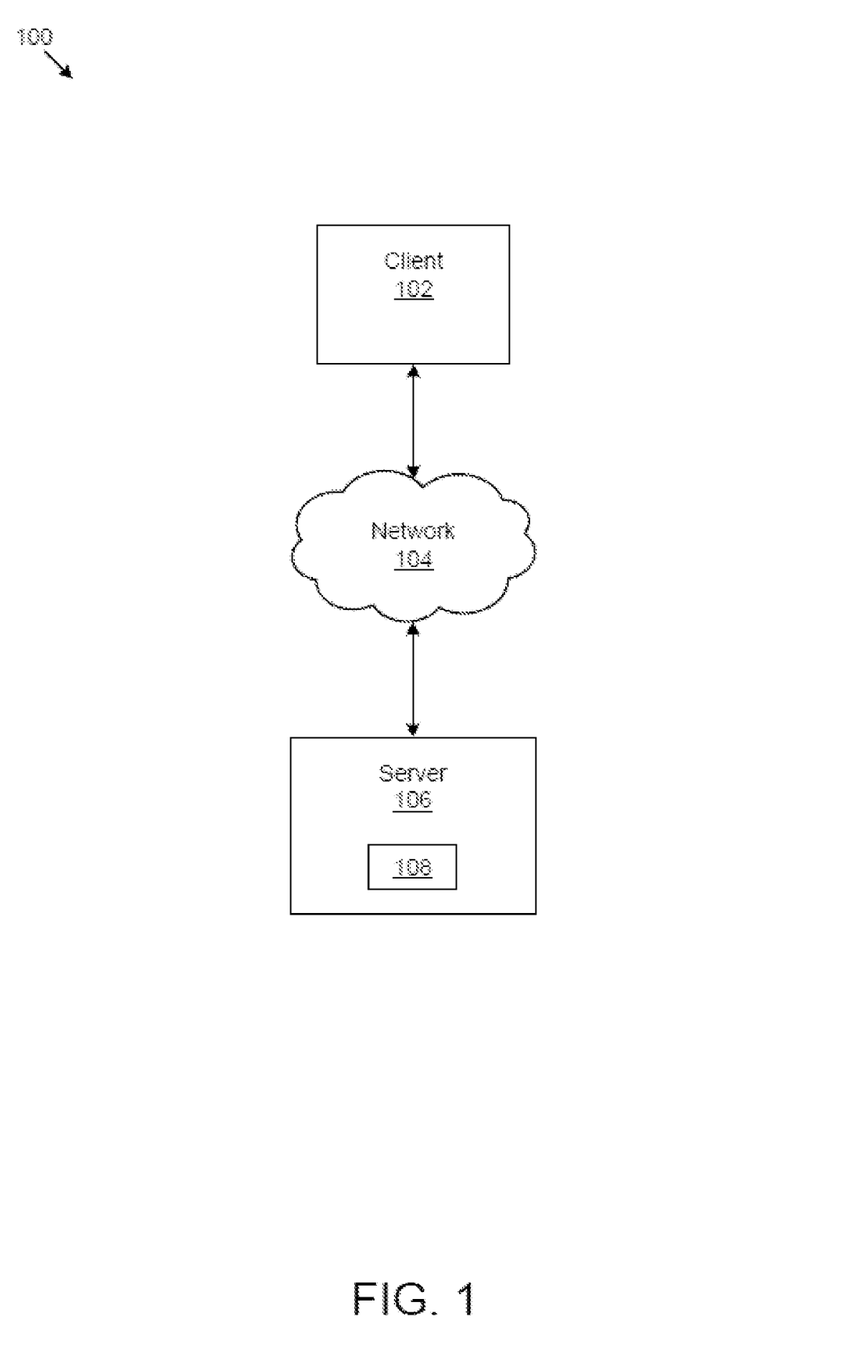
FIG. 1 is a schematic block diagram illustrating one embodiment of a system for product identification using image analysis and user interaction.

FIG. 1 illustrates one embodiment of a system 100 for product identification using image analysis and user interaction. The system 100 includes a client 102, a network 104, and a server 106 with a product identifier 108. Those of skill in the art recognize that the system 100 may be simpler or more complex than illustrated, so long as the system 100 includes modules or sub-systems that correspond to those described herein.

The client 102 may be a personal computer, a cell phone, a Personal Digital Assistant (PDA) or any other electronic device capable of interfacing with a network 104 and transmitting a digital image. The client 102 may be capable of operating a specialized software applicant to interface with the server 106 over the network 104. Furthermore, the client 102 may also interface with the server 106 over the network 104 using an existing software application such as a web browser like Internet Explorer or Mozilla Firefox.

The client 102 communicates over a network 104 with the server 106 to upload digital images and to receive and display digital images along with associated information. The network 104 may comprise a global communications network such as the Internet, a cellular communications network, or other communications network. The network 104 may also be a Local Area Network (LAN) or multiple LANs communicating over the internet.

The server 106 may communicate with the client 102 over the network 104 through a client application. Furthermore, the server 106 may communicate with the client 102 over the network 104 with a web browser, as previously mentioned.

The server 106 may include a product identifier 108. The product identifier 108 may receive an image uploaded by a user from the client 102. Furthermore, the product identifier 108 may identify a product for a user based on the uploaded image and feedback from the user. The product identifier 108 may also then transmit information about the product to the client 102 to be accessed by the user. Therefore, a user may learn the identity of her product and receive any necessary information such as warranty information, instruction manuals, product safety and recall information, and the like. Furthermore, a user may wish to keep a product inventory using the product identifier 108. A user may upload photographs of his products to identify the products, associate the products with information, and upload other information about the products such as purchase date, value, or whether the product is insured.

The product identifier 108 may interface with a third-party web service such as a social networking application, an insurance tracking program, or a data management program to store images and information.

The product identifier 108 is not limited in location to a server. Specifically, the product identifier 108 may be located on the client and may comprise an application running on a user's computer.

Figure 2:
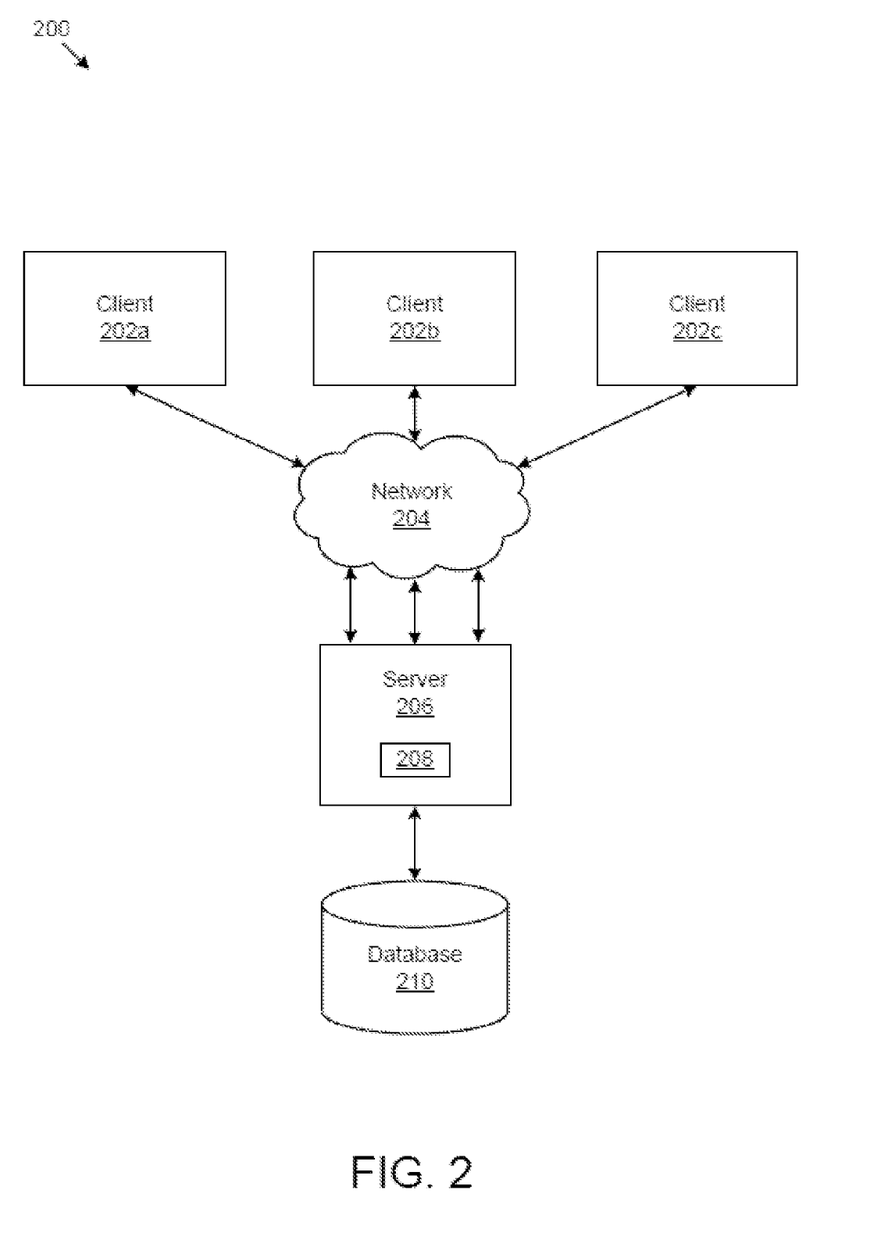
FIG. 2 is a schematic block diagram illustrating an alternative embodiment of a system for product identification using image analysis and user interaction.

FIG. 2 illustrates a preferred embodiment of a system 200 for product identification using image analysis and user interaction. The system 200 includes multiple clients 202(a-c), a network 204, a server 206 with a product identifier 208, and a database 210 connected to the server. Those of skill in the art recognize that the system 200 may be simpler or more complex than illustrated, so long as the system 200 includes modules or sub-systems that correspond to those described herein.

The clients 202(a-c), the network 204, the server 206, and the product identifier 208 may be similar to the client 102, network 104, server 106, and product identifier 108 described above in relation to FIG. 1. However, the server 206 may be capable of interfacing with multiple clients 202(a-c). Specifically, the server 206 may operate as a web server or otherwise interface with a web service to identify products for multiple users. Those of skill in the art recognize that the system 200 may utilize multiple servers 206 while maintaining the functionality described above.

The server 206 may be in communication with a database 210 to store user and product information. The database 210 may track the products that a user owns for a product inventory or for security purposes. In addition, the database 210 may store retail product images for use in comparison with a retail image that the user uploads. Along with the retail images, the database 210 may store the corresponding product information and characteristics. Those of skill in the art recognize that multiple databases 210 may be used.

Figure 3:
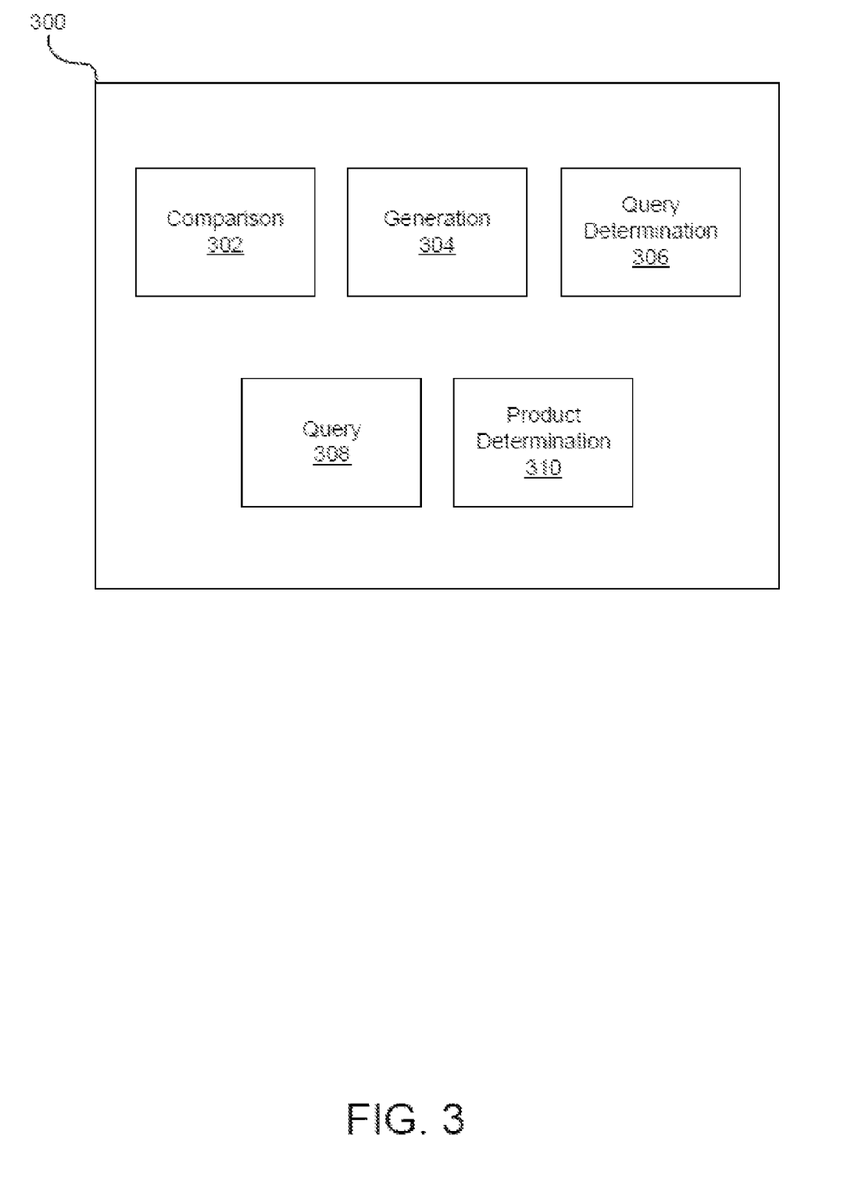
FIG. 3 is a schematic block diagram illustrating one embodiment of an apparatus for product identification using image analysis and user interaction.

FIG. 3 illustrates one embodiment of an apparatus 300 for product identification using image analysis and user interaction. The apparatus 300 depicts one embodiment of a product identifier 208 and includes a comparison module 302, a generation module 304, a query determination module 306, a query module 308, and a product determination module 310.

The comparison module 302 compares a retail product image to several candidate retail product images. The retail product image may consist of pictorial likeness of a manufactured retail product. The retail product may include electronics, toys, clothing, household items, prescription or over-the-counter drugs, or the like.

The image may be stored as a bitmap, JPEG, or any other digital format known in the art. A user may obtain the retail product image with a digital camera photograph of the product and load the photograph onto the user's personal computer. Furthermore, the user may obtain the retail product image from the internet, if the user is able to locate an image of the product. Moreover, the user may scan an image of the product from the product packaging if the user has such packaging in his possession. The user may upload the retail product image to the comparison module 302 from the client 202a through an application on the client. For example, a user may take a digital photograph of a television, transfer the resulting image to her personal computer, and upload the image to the comparison module 302 through her web browser.

The user may also have an image of the retail product in a previously taken photograph. For example, if the user had a product that she lost and wanted to replace, the user could find a photograph which contained an image of the product. If a single image contains several other objects including the product, the comparison module 302 may distinguish the product from the surrounding portion of the photograph using color and image texture sensitivity. In one embodiment, the comparison module 302 may make comparisons of multiple retail products from one image. In this embodiment, the comparison module 302 may determine one product from the image, make the comparison, and then continue to determine and compare each product in the image. For example, a user may wish to identify a room full of products from a single photograph.

The comparison module 302 may retrieve the candidate retail product images for comparison from a repository such as a database 210. Furthermore, the comparison module may compare the retail product image with candidate retail product images using object, pattern, and color recognition technology known in the art. In one embodiment, the comparison module 302 may send the retail product image to a third party image comparison service. The comparison module 302 may make an initial, limited comparison to narrow the amount of candidate retail product images with which to compare the retail product image. For example, the initial comparison may extract basic color or shape information of the retail product image, thereby decreasing the scope of the comparison search to candidate retail product images with similar shape or color.

In addition, the comparison module 302 may use initial information from the user such as a general category of product or general use of the product to decrease the amount of candidate retail product images that require searching. Therefore, if user has specified that the retail product is a lawnmower, the comparison module 302 will only run a comparison search with candidate retail product images of lawnmowers.

In some embodiments, the comparison module 302 may perform a series of comparisons on multiple retail product images. For example, a user seeking compatibility information between a hard drive and laptop computer may upload a picture of both items. The comparison module 302 may perform a comparison for each image for later compatibility analysis.

The generation module 304 generates a candidate product set out of the candidate retail product images. The candidate product set contains candidate retail product images that satisfy image comparison criteria.

The image comparison criteria may be user-configurable. In addition, the image comparison criteria may be predefined based on optimal criteria standard in the image comparison art. In addition, the generation module 304 may contain a predetermined tolerance parameter configured to allow for variance in color, shape, or appearance of the product. For example, the generation module 304 may generate images of candidate retail products of different colors but the same shape as the user's retail product image, or conversely, different shapes but the same color.

In the candidate product set generated by the generation module 304, each candidate retail product image represents an individual retail product. Furthermore, each product in image form is associated with product characteristics in text form. The characteristics associated with a retail product may include but not be limited to warranty information, an instruction manual, product recall information, product history, a model number, a manufacturer, new models, compatibility information, value, insurance information, drug side-effects, dosage, drug interactions, and the like. For example, a certain brand of television is a candidate retail product image and the product in the image is associated with the model number of the television, the instruction manual, and the warranty information.

In one embodiment, the product characteristics specifically relate to two or more images the user has inputted. For example, if the user has input an image of a hard drive and a laptop computer for a compatibility check, the product characteristics would consist of compatibility information related to the two products. Similarly, if a user inputs two pictures of certain prescription or over-the-counter drugs, the product characteristics may relate to possible drug interactions.

A custom data structure capable of storing different data types may implement the storage and association between an image file and text. For example, a candidate product set may store multiple instances of this custom data structure, the data structure, in turn, storing a product image as a JPEG file and the product information as a text file.

Alternatively, the custom data structure may also contain a pointer to the location of the image file in storage and a pointer to the product information file. The data structure may also store multiple pointers for multiple images or multiple units of product information. This implementation is useful if the generation module is configured to accommodate multiple images of each individual product such as images from various angles.

Furthermore, a relational database may also implement the image/text association. For example, product image files or pointers in memory or file paths to product image files may be stored in an "images" table and product characteristics text or pointers in memory or file paths to product characteristics files may be stored in a "characteristics" table. A join table that also joins a "productID" table may join the two tables. Those of skill in the art recognize that the use of multiple databases and data structure configurations may also maintain a similar level of functionality.

The query determination module 306 determines one or more product identity queries to solicit additional product identity information from a user. In one embodiment, the query determination module 306 bases the product identity queries on the candidate retail product images in the candidate product set. Specifically, the query determination module 306 may determine product identity queries that will eliminate members of the candidate product set to narrow the possibilities for the identity of the product. The product queries may solicit such information as a purchase location, a product category, a product description, and a product serial number.

For example, if the candidate product set contains two candidate retail product images of LCD screens, and one LCD screen was only sold in a certain geographical area, the query determination module 306 may determine a product identity query that will ask a user the location where he purchased the LCD screen, such as a zip code. In this manner, the query may eliminate one of the LCD screens from the candidate product set.

In some embodiments, the product identity queries will require the user to perform some task to transmit the product identity information. Such tasks may include a request for an instruction manual scan, an RFID scan, a receipt scan, and other tasks involved with digitally inputting product information. Furthermore, one product identity query may request that the user input additional images of the product. For example, the query determination module 306 may determine that two candidate retail products are identical when viewed from one perspective, but sufficiently distinct from when viewed from other perspectives, the query determination module 306 may determine a query to request the user to upload additional images of the user's retail product from different perspectives.

The number of product identity queries determined by the query determination module 306 may vary according to the size of the candidate retail product set. In addition, the number of queries may also depend on the quality of the retail product image provided by the user. For example, if the quality of the image is poor, the level of user involvement in the product determination is greater and the query determination module 306 will determine a greater number of product identity queries.

The query determination module 306 may determine a set number of queries and run through the set to eliminate candidate retail product images. The query determination module 306 may also dynamically determine product identity queries. Specifically, query determination module 306 may utilize the product identity information provided by the user in answer to the last product identity inquiry to generate product identity queries. For example, if the product identity information supplied by the user eliminated several candidate retail product images, the query determination module 306 will not determine product identity queries regarding those eliminated images.

Furthermore, the query determination module 306 may have a query threshold that indicates when the query determination module 306 will discontinue determining queries. This threshold may be user-configurable, or may have a default setting to optimize a balance between performance and accuracy.

The query module 308 queries the user with the product identity inquiries. In one embodiment, the query module 308 may comprise a user-interface that displays the query and waits for user input. A Hyper Text Transfer Protocol (HTML) page over the internet may implement the query module 308. Specifically, the query module 308 may include HTML code for a front-side user interface, and server-side code to dynamically modify the page displayed to the user as is known in the art. A client application that receives queries as input from a client-based logic unit may also implement the query module 308. Those of skill in the art recognize that the query module 308 may be implemented by several means on several devices including cell phones, PDAs, personal computers, and the like.

The product determination module 310 determines a product match based on additional product identity information from the user in response to the one or more product identity inquiries. In one embodiment, if the product identity queries have eliminated all but one candidate retail product, the product determination module determines that the remaining product is the product match.

In another embodiment, the product determination module 310 tracks a probability that each candidate retail product image is the product match. The probability may be based on the image comparison, the user-supplied product information in answer to the queries, the characteristics associated with the product, or a combination of these or other factors. If the product determination module 310 determines that more than one product image has equal probability of being the target match after a certain number of queries have been determined, the query threshold is satisfied, or the probability change in the candidate retail products is insignificant after every product identity query, the product determination module may determine that multiple products are potential matches. In this embodiment, the product determination module 310 may generate a potential match list with multiple candidate retail products.

Figure 4:
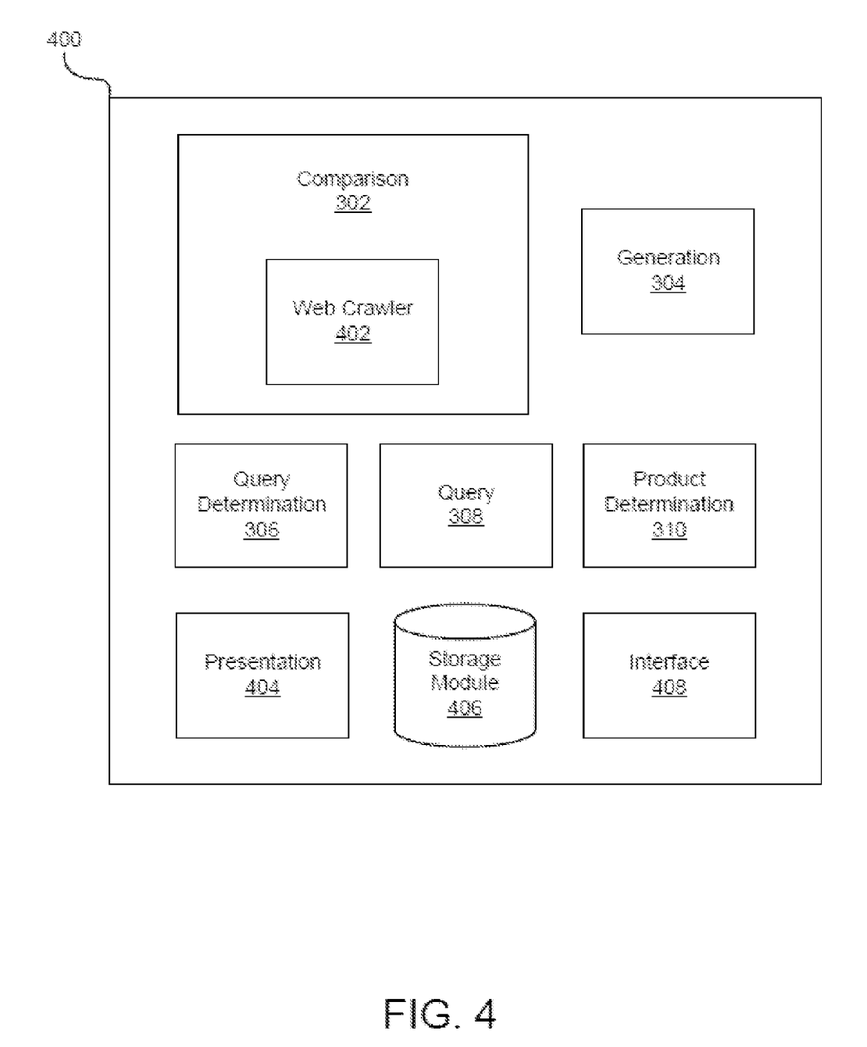
FIG. 4 is a detailed schematic block diagram illustrating one embodiment of an apparatus for product identification using image analysis and user interaction.

FIG. 4 illustrates another embodiment of an apparatus 400 for product identification using image analysis and user interaction. The apparatus 400 includes the comparison module 302, the generation module 304, the query determination module 306, the query module 308, and the product determination module 310, wherein these modules include substantially the same features as described above with relation to FIG. 3. Additionally, in one embodiment, the comparison module 302 contains a web crawler module 402. The apparatus may also contain a presentation module 404, a storage module 406, and an interface module 408.

The web crawler module 402 obtains candidate retail product images from the internet to be used by the comparison module 302 when comparing a retail product image. In one embodiment, the web crawler module 402 searches the websites of retail product manufacturers and captures product images and characteristic data. In another embodiment, the web crawler module 402 searches image sharing websites or the entire internet with image searching technology known in the art.

The web crawler module 402 may store the acquired retail product images and associated characteristics in a database 210 for future use in comparison. Alternatively, the web crawler module 402 may search the internet in real time as the image comparison is in operation. In this embodiment, the web crawler module 402 may focus on the websites of product manufacturers of the type of product in the retail product image. For example, if the retail product image is a toy, the web crawler module 402 may restrict its real time search to toy manufacturer websites.

The presentation module 404 presents the product match to the user. In one embodiment, the presentation module 404 presents the product match for verification. The user may accept or reject the product match. If the user accepts the product match, the presentation module 404 may present the product characteristics associated with the product match to the user. Alternatively, the presentation module 404 may present the product characteristics to the user without allowing the user to verify the product match. In this embodiment, the presentation module 404 may assume that the product match is correct. In some embodiments, the presentation module has user-configurable settings on which to base the presentation operation.

In one embodiment, the presentation module 404 may also determine a product compatibility between the product match and one or more additional retail products. Furthermore, the presentation module 404 may display compatibility information to the user regarding the product match and products stored in the user's product inventory or other products.

In one embodiment, the presentation module 404 runs in the background of a user's computer and notifies a user in the event of a product recall, new product characteristic availability, a new model of one of the user's products, a drug safety alert, and the like. The presentation module 404 may also reference a newly loaded retail product image with other retail product images loaded in the past by the user. In this embodiment, the presentation module 404 may notify a user about compatibility between the newly loaded retail product and other products owned by the user.

Like the query module 308, the presentation module 404 may be implemented with HTML pages over the internet. Specifically, the presentation module 404 may include HTML code comprises a front-side user interface, and server-side code to dynamically modify the page displayed to the user as is known in the art. The presentation module 404 may also be implemented by a client application that receives queries as input either from a client-based logic unit, or from the internet through an interface.

The storage module 406, in one embodiment, stores the product match, the plurality of product characteristics associated with the product match, and user information. In this manner, a user could maintain an inventory of products that she owns. User information may include the user's name, where the user purchased the product, the value of the product, whether the product is insured, purchase information, and so forth. The storage module 406 may maintain an insurance inventory of household goods in case of theft or disaster along with an estimated value. The storage module 406 may also maintain an inventory list for tax purposes including charitable donations.

In one embodiment, the storage module 406 is a user-specific repository stored either on a user's personal computer or on the internet as part of a web service. In another embodiment, the storage module 406 stores the user and product information for multiple users.

The interface module 408 sends and receives user product data with an independent web service through an interface. An insurance company, product manufacturer, data collectors, or other such entity may utilize the interface module 408.

In another example, an insurance company may, through an interface between the insurance company's application and the interface module 408, monitor a user's product inventory by ensuring that each product a user claims for insurance purposes corresponds to an image and purchase information such as a receipt.

The user may also utilize the interface module 408 to share goods and product information with various applications. For example, the user may interface with a tax software program to upload a list of products donated to charity.

Figure 5:
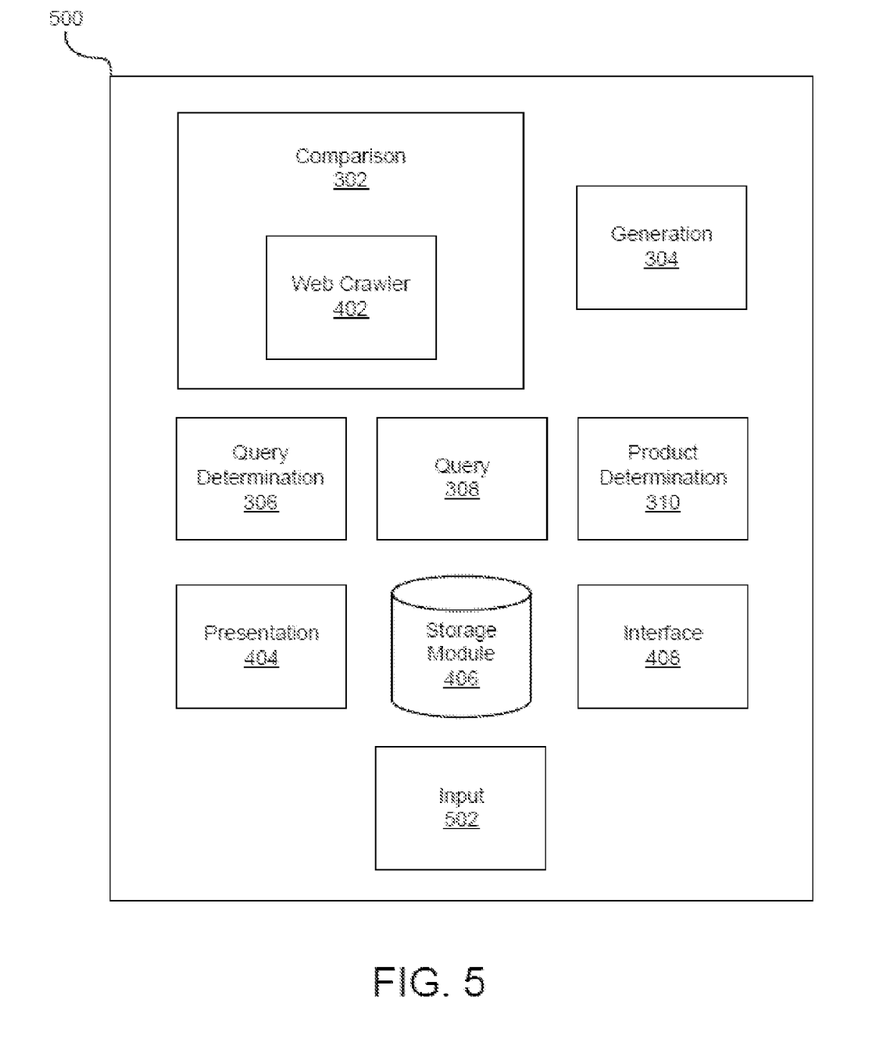
FIG. 5 is a detailed schematic block diagram illustrating another embodiment of an apparatus for product identification using image analysis and user interaction.

FIG. 5 illustrates another embodiment of an apparatus for product identification using image analysis and user interaction. The apparatus 400 includes similar modules described above with relation to FIG. 4. Additionally, in one embodiment, the apparatus 400 contains an input module 502.

The input module 502 may receive product information from the user in response to the one or more product identity inquiries. In another embodiment, the input module 502 receives a request from the user for product identification. The input module 502 may also input a retail product image from the user. If the user is interested in finding product matches for several products, the input module 502 may receive several retail product images for comparison. For example, to determine product compatibility, the input module 502 may first receive an image of a user's hard drive then an image of a user's laptop computer.

In another embodiment, when a user proceeds to input images showing several products, the input module 502 may provide a drag-and-drop interface that allows the user to select the portion of the photograph in which the retail product is located.

In a further embodiment, the input module inputs additional information to associate with the product. In this manner, a user may, after a successful product identification, store information such as purchase date, value, purchase location, and so forth to build a product inventory.

As with the presentation module 404, the input module 502 may be implemented with HTML and dynamic web pages, a client side software application, or the like.

Figure 6:
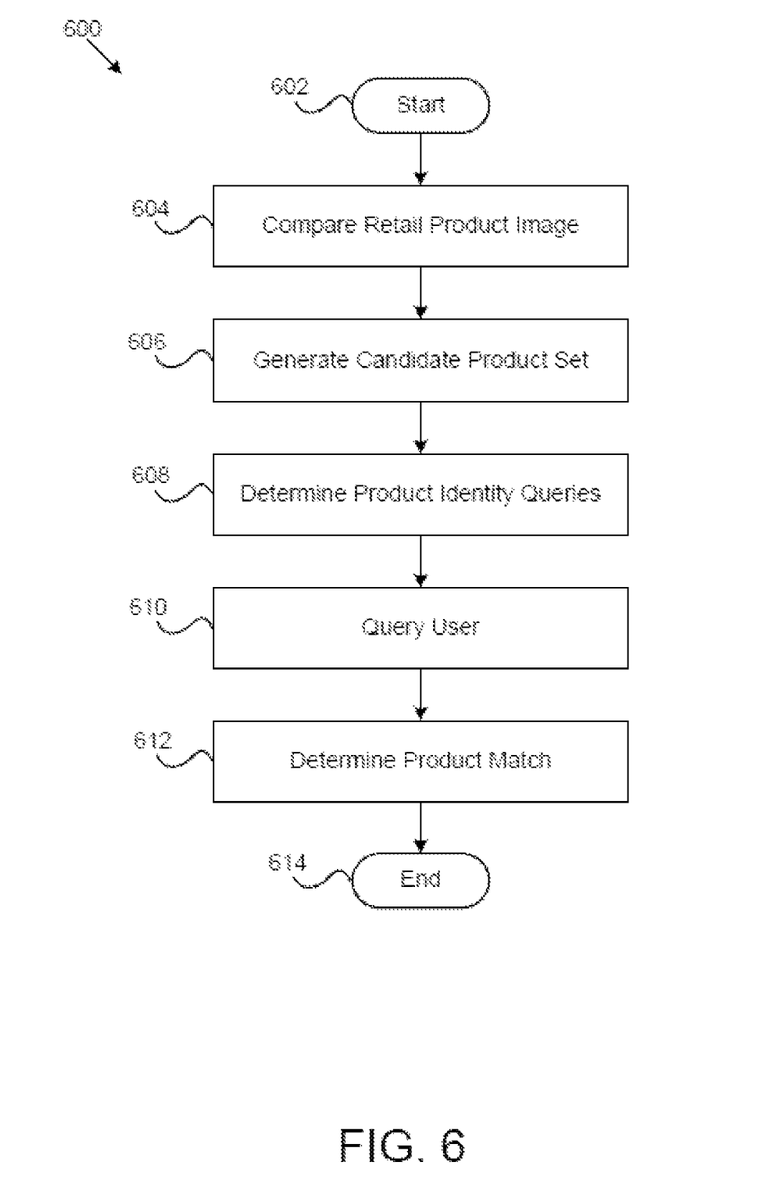
FIG. 6 is a schematic flow chart diagram illustrating one embodiment of a method for product identification using image analysis and user interaction.

FIG. 6 illustrates one embodiment of a method 600 for product identification using image analysis and user interaction. The method 600 starts 602 when the comparison module 302 compares 604 a retail product image to multiple candidate retail product images. Next, the generation module 304 generates 606 a candidate product set with candidate retail product images that satisfied an image comparison analysis. The query determination module 306 then determines 608 product identity queries to obtain additional product identity information from a user that will eliminate members of the candidate product set. The query module 308 queries 610 the user with these product identity inquiries. Finally, the product determination module 310 determines 612 a product match based on the additional product identity information obtained from the user in response to the queries. Then the method 600 ends 614.

For example, John wants to determine the manufacturer of a dresser in his possession. The comparison module 302 compares 604 an image of John's dresser to images of other dressers. Next, the generation module 304 generates 606 a candidate product set with four images of potential matches that appeared sufficiently similar in the image comparison analysis. The query determination module 306 then determines 608 a query regarding the date of purchase of the dresser and a query regarding a design on the legs of the dresser. The query module 308 queries 610 John with these queries. Finally, the product determination module 310 determines 612 that image four represents John's dresser because the dresser was purchased twenty years ago and has a particular design on the legs.

Figure 7:
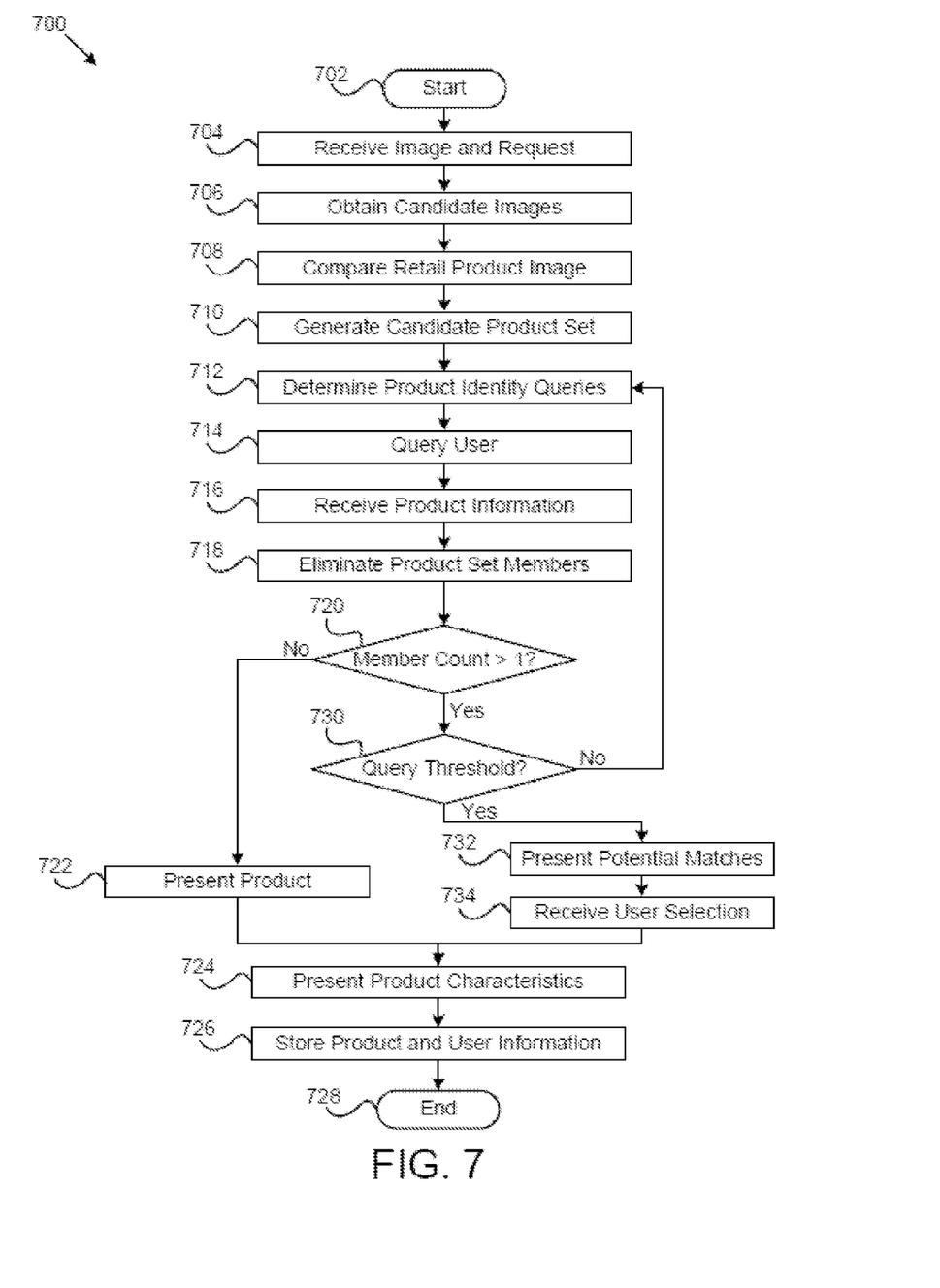
FIG. 7 is a detailed schematic flow chart diagram illustrating one embodiment of a method for product identification using image analysis and user interaction.

FIG. 7 illustrates a detailed embodiment of a method 700 for product identification using image analysis and user interaction. The method 700 starts 702 when the input module 502 receives 704 a product identification request and a retail product image. Next, the comparison module 302 obtains 706 candidate retail product images for comparison from a repository. The comparison module 302 may also obtain 706 candidate retail product images from the internet through the web crawler module 402. The comparison module 302 then compares 708 a retail product image to the candidate retail product images. The generation module 304 generates 710 a candidate product set comprising candidate retail product images satisfying image comparison criteria.

Next, the query determination module 306 determines 712 product identity queries to solicit additional product identity information from a user and to eliminate members of the candidate product set. The query module 308 queries 714 the user with the product identity inquiries from the generation module 304. The input module 502 receives 716 product information from the user in response to the product identity inquiries. This product information may be additional images of the product or may be information such as a purchase location, a product category, a product description, and a product serial number.

The product determination module 310 eliminates 718 members of the candidate product set based on the information received from the user. The product determination module 310 then determines 720 if the number of members in the product candidate set is greater than one. If no, the presentation module 404 presents 722 the product match to the user for verification. Once verified, the presentation module 404 presents 724 the plurality of product characteristics associated with the product match to the user. Finally, the storage module 406 stores 726 the product match, the product characteristics associated with the product match, and user information with a database 210 and the method 700 ends 728.

Alternatively, if the product determination module 310 determines 720 that the member count is greater than one, the product determination module 310 then determines 730 if the query threshold has been satisfied. The query threshold may be predetermined based on an optimal number of queries. Alternatively, the query threshold may be dynamically generated by the query generation module 306 based on the number of candidate product images and the amount of possible queries. If the query threshold has not been satisfied, the query determination module 306 determines 712 more product identity queries to further narrow the candidate product set. The query module 308 queries 714 the user with these product identity inquiries from the generation module 304.

The input module 502 receives 716 additional product information from the user, the product determination module 310 further eliminates 718 members of the candidate product set, and the product determination module 310 once again determines 720 if the number of members in the product candidate set is greater than one. If the member count is greater than one, and the query threshold has been fulfilled 730, the presentation module 404 presents a potential match list to the user for the user to select a product match as any further queries would be ineffective in narrowing the possible matches. The input module 502 receives 734 the product match selected by the user. The presentation module 404 presents 724 the product characteristics associated with the product match to the user and the storage module 406 stores 726 the product match, the plurality of product characteristics associated with the product match, and user information in a database 210 and the method 700 ends 728.

For example, Jane accesses a product identification service on the internet using her home computer 202a and an internet browser. The input module 502 of the product identifier 208 housed on a server 206 receives 704 a product identification request from Jane and a retail product image of a child's toy in her possession. The web crawler module 402 obtains 706 candidate retail product images from toy manufacturer websites along with other images obtained 706 from a repository. The comparison module 302 then compares 708 the image of the toy to the candidate retail product images. The generation module 304 generates 710 a candidate product set with 12 potential products based on the image comparison.

Next, the query determination module 306 determines 712 product identity queries for Jane to eliminate members of the candidate product set. Because 5 of the candidate images are of toys released in the last year at particular retail stores, the queries involve where she purchased the toy and the approximate date of purchase. The query module 308 queries 714 Jane through her web browser with the product identity inquiries. The input module 502 receives 716 receives the information from Jan that the toy was purchased three years ago at a particular retailer. The product determination module 310 eliminates 718 the five members of the candidate product set based this information. The product determination module 310 then determines 720 that the number of members in the product set is greater than zero.

Next, the product determination module 310 determines 730 that the query threshold has not been satisfied, or that the product determination module 310 may further eliminate product set members by generating more queries. The product determination module 310 repeats the query determination 712, query process 714 and member elimination 718. As a result, the product determination module 310 eliminates 718 six more members of the candidate product set leaving only one candidate product of a toy. The product determination module 310 determines that the member count of the product set is not greater than one and the presentation module 404 presents 722 the product match to Jane over her web browser. The presentation module 404 also presents 724 the product characteristics associated with the product match to Jane. Jane is able to determine that the toy in question is not affected by a recent safety recall. Finally, the storage module 406 stores 726 the toy, the characteristics of the toy, and Jane's information in a database 210 to alert Jane of any future safety recalls that might affect the toy.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product for a product identification service using image analysis and user interaction, the computer program product comprising:
   a non-transitory computer readable storage medium to electronically store instructions, wherein the instructions, when executed by a processor within a computer, are configured to cause the processor to perform operations for the product identification service, the operations comprising:
      comparing a first portion of a retail product image to a plurality of candidate retail product images, wherein the retail product image comprises a pictorial likeness of a plurality of manufactured retail products, and the first portion of the retail product image corresponds to a first retail product;
      generating a candidate product set comprising candidate retail product images satisfying image comparison criteria, wherein each candidate retail product image is representative of a retail product having a plurality of product characteristics; and
      determining, based on at least one candidate retail product image in the candidate product set, one or more product identity queries configured to solicit additional product identity information from a user.

2. The computer program product of claim 1, wherein the instructions, when executed by the processor, are configured to cause the processor to perform further operations comprising distinguishing the first retail product from surrounding retail products shown in the retail product image.

3. The computer program product of claim 1, wherein the instructions, when executed by the processor, are configured to cause the processor to perform further operations comprising receiving a product identification request and the retail product image of the plurality of retail products.

4. The computer program product of claim 1, wherein the instructions, when executed by the processor, are configured to cause the processor to perform further operations comprising:
   querying the user with the one or more product identity queries;
   determining a product match based on the additional product identity information from the user in response to the one or more product identity queries, wherein the product match identifies a matching retail product corresponding to one of the candidate retail product images of the candidate product set; and
   presenting the product match to the user.

5. The computer program product of claim 4, wherein the instructions, when executed by the processor, are configured to cause the processor to perform further operations comprising:
   receiving verification of the product match from the user; and
   returning the plurality of product characteristics associated with the product match in response to the verification of the product match from the user.

6. The computer program product of claim 4, wherein the instructions, when executed by the processor, are configured to cause the processor to perform further operations comprising saving the product match, the plurality of product characteristics associated with the product match, and user information in a product inventory within a repository.

7. The computer program product of claim 4, wherein the instructions, when executed by the processor, are configured to cause the processor to perform further operations comprising:
   distinguishing a plurality of retail products from each other in the retail product image;
   determining a plurality of product matches corresponding to the plurality of retail products in the retail product image; and
   presenting the plurality of product matches to the user.

8. A method for facilitating product identification using image analysis and user interaction, the method comprising:
   comparing a first portion of a retail product image to a plurality of candidate retail product images, wherein the retail product image comprises a pictorial likeness of a plurality of manufactured retail products, and the first portion of the retail product image corresponds to a first retail product;
   generating a candidate product set comprising candidate retail product images satisfying image comparison criteria, wherein each candidate retail product image is representative of a retail product having a plurality of product characteristics; and
   determining, based on at least one candidate retail product image in the candidate product set, one or more product identity queries configured to solicit additional product identity information from a user.

9. The method of claim 8, further comprising using color and texture analysis to distinguish the first retail product from surrounding retail products shown in the retail product image.

10. The method of claim 8, further comprising:
    receiving a product identification request and the retail product image of the plurality of retail products;

querying the user with the one or more product identity queries;

determining a product match based on the additional product identity information from the user in response to the one or more product identity queries, wherein the product match identifies a matching retail product corresponding to one of the candidate retail product images of the candidate product set; and presenting the product match to the user.

11. The method of claim 8, further comprising:

receiving verification of the product match from the user;

returning the plurality of product characteristics associated with the product match in response to the verification of the product match from the user; and saving the product match, the plurality of product characteristics associated with the product match, and user information in a product inventory within a repository.

12. The method of claim 8, further comprising:

distinguishing a plurality of retail products from each other in the retail product image;

determining a plurality of product matches corresponding to the plurality of retail products in the retail product image; and presenting the plurality of product matches to the user.

13. A computer program product for product compatibility analysis, the computer program product comprising:

a non-transitory computer readable storage medium to electronically store instructions, wherein the instructions, when executed by a processor within a computer, are configured to cause the processor to perform operations for the product identification service, the operations comprising:

comparing a first retail product image to a first plurality of candidate retail product images to identify a first retail product depicted in the first retail product image;

comparing a second retail product image to a second plurality of candidate retail product images to identify a second retail product depicted in the second retail product image; and performing a compatibility check to identify at least one product characteristic related to compatibility information between the first retail product and the second retail product.

14. The computer program product of claim 13, wherein the instructions, when executed by the processor, are configured to cause the processor to perform further operations comprising receiving the first retail product image and the second retail product image from a user.

15. The computer program product of claim 13, wherein the first retail product depicted in the first retail product image is a first computer hardware device, and the second retail product depicted in the second retail product image is a second computer hardware device, and the compatibility information indicates whether the first computer hardware device of the first retail product image is compatible with the second computer hardware device of the second retail product image.

16. The computer program product of claim 13, wherein the first retail product depicted in the first retail product image is a first drug, and the second retail product depicted in the second retail product image is a second drug, and the compatibility information indicates possible drug interactions between the first drug of the first retail product image and the second of the second retail product image.

17. A method for product compatibility analysis, the method comprising:

comparing a first retail product image to a first plurality of candidate retail product images to identify a first retail product depicted in the first retail product image;

comparing a second retail product image to a second plurality of candidate retail product images to identify a second retail product depicted in the second retail product image; and performing a compatibility check to identify at least one product characteristic related to compatibility information between the first retail product and the second retail product.

18. The method of claim 17, wherein the instructions, when executed by the processor, are configured to cause the processor to perform further operations comprising receiving the first retail product image and the second retail product image from a user.

19. The method of claim 18, wherein the first retail product depicted in the first retail product image is a first computer hardware device, and the second retail product depicted in the second retail product image is a second computer hardware device, and the compatibility information indicates whether the first computer hardware device of the first retail product image is compatible with the second computer hardware device of the second retail product image.

20. The method of claim 18, wherein the first retail product depicted in the first retail product image is a first drug, and the second retail product depicted in the second retail product image is a second drug, and the compatibility information indicates possible drug interactions between the first drug of the first retail product image and the second of the second retail product image.

* * * * *